United States Patent [19]

Halligan et al.

[11] Patent Number: 4,574,987

[45] Date of Patent: Mar. 11, 1986

[54] DISPENSER PACKAGE FOR SOFT-FROZEN COMESTIBLES

[75] Inventors: John F. Halligan, Riverside, Conn.; Violet R. Leone, Elmsford, N.Y.; Andrew T. Kostanecki, Darien, Conn.

[73] Assignee: General Foods Corporation, White Plains, N.Y.

[21] Appl. No.: 606,032

[22] Filed: May 1, 1984

[51] Int. Cl.[4] .................. B65D 35/08; B67D 5/60
[52] U.S. Cl. ................... 222/107; 222/131; 222/94; 383/107; 383/110
[58] Field of Search ............. 222/92, 131, 105, 107; 383/109, 110, 116, 907, 3, 107

[56] References Cited

U.S. PATENT DOCUMENTS

| | | | |
|---|---|---|---|
| 1,233,802 | 7/1917 | Lowe et al. | 222/107 |
| 1,870,903 | 8/1932 | Geisler | 222/92 |
| 1,922,171 | 8/1933 | McMahon | 222/107 |
| 2,686,616 | 8/1954 | Barlow | 222/107 |
| 3,734,394 | 5/1973 | Dooley | 383/109 |
| 3,752,364 | 8/1973 | De Vries | 222/131 |
| 3,936,334 | 2/1976 | Kushida et al. | 222/107 |
| 4,172,152 | 10/1979 | Carlisle | 383/110 |

*Primary Examiner*—Joseph J. Rolla
*Assistant Examiner*—Andrew Jones
*Attorney, Agent, or Firm*—T. R. Savoie; T. A. Marcoux; D. J. Donovan

[57] ABSTRACT

A collapsible package for a soft-frozen ice cream product which includes a cone-shaped body portion comprised of inner and outer preformed cone-shaped members a nozzle secured at the top of the cone-shaped body portion and a cap or cover across the nozzle aperture. The inner and outer cones are bonded together over less than 20% of their adjacent surface areas so that an insulative layer of air exists between the inner and outer cones.

13 Claims, 3 Drawing Figures

U.S. Patent   Mar. 11, 1986   4,574,987
FIG. 1
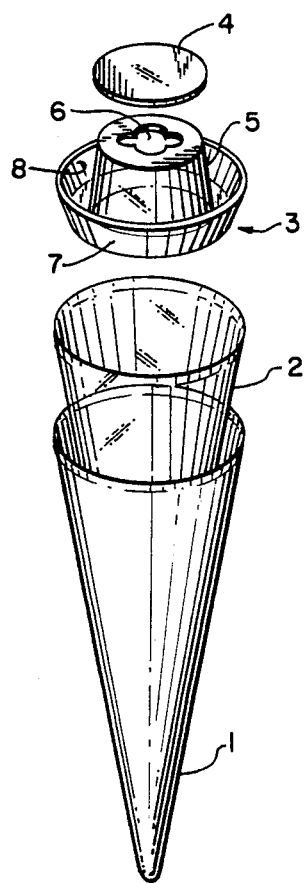
FIG. 2
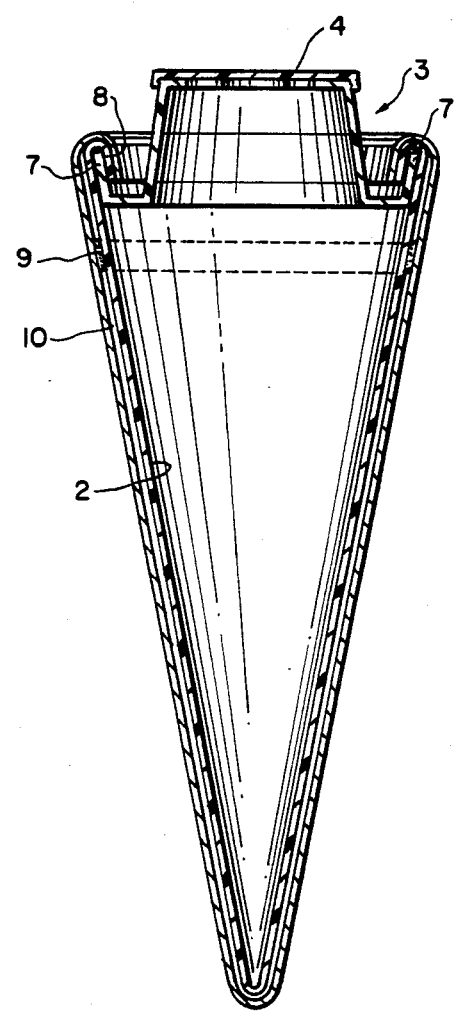
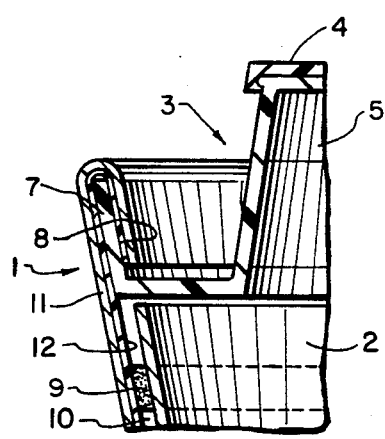
FIG. 3

DISPENSER PACKAGE FOR SOFT-FROZEN COMESTIBLES

TECHNICAL FIELD

The present invention relates to a package for dispensing extrudable comestibles. More particular, the present invention relates to hand-held collapsible packages containing soft-frozen comestibles which package may be squeezed by the consumer so as to extrude the soft-frozen contents through an orifice in the package.

Hand-held dispenser packages which may be squeezed and collapsed either by means of direct hand pressure or pressure exerted by means of a mechanical device such as a wind-up key or roller are well-known in the art. These packages, such as toothpaste tubes, are typically made of relatively expensive materials such as metal foils or heavy gauge plastics so as to withstand the rather substantial pressures which are exerted on the package during the dispensing process. These packages are costly to produce and would not be suitable for marketing and dispensing small, for example, single servings, of extrudable food materials such as soft-frozen comestibles.

Recently, there have been developed several versions of frozen dessert products such as ice creams and ice milks which maintain a soft, extrudable consistency during freezer storage in the range of 0° to 15° F.

Such products are disclosed in U.S. Pat. No. 4,145,454 to Dea et al., U.S. Pat. No. 4,224,977 to Kahn et al., U.S. Pat. Nos. 4,400,405 and 4,440,406 to Morley et al. and U.S. Pat. No. 4,374,154 to Cole et al. All of these products which have a moisture content in excess of 30% by weight are designed to be consumed directly from the freezer and provide a soft ice cream eating experience in the home environment. It would be desirable to package such products in small volume, disposable and collapsible packages whereby the consumer could intermittently squeeze essentially all of the product from the package, thus providing a hand-held frozen confection.

Such individual or single service packages must, of course, be relatively inexpensive to produce, and the packages must be strong enough to avoid splitting or tearing during the dispensing or extruding process. The packages most desirably will also provide a means whereby transfer of heat from the hand of the consumer to the soft frozen product is minimized. It has been found that not only is it desirable to insulate the consumers hand from the coldness of the soft-frozen comestible in order to avoid discomfort to the consumer, but it is also desirable to refrain from elevating the temperature of the comestible so that the soft frozen (i.e., ice cream-like) consistency of the comestible is retained until it is fully consumed. The disclosed invention addresses and meets these needs.

SUMMARY OF THE INVENTION

According to this invention a hand-held extruder package is fabricated, said package being comprised of a collapsible, cone-shaped body portion which is secured to a pre-formed, relatively-rigid, circular fitment, which fitment contains both an extrusion orifice through which the package contents are dispensed and an upstanding rim around its periphery which enables the body portion to be secured to the fitment. The package is also provided with a closure means which covers the extrusion orifice so that the package contents will be protected against contamination. The collapsible cone-shaped body portion is comprised of inner and outer pre-formed cone-shaped members which are bonded together, if at all, over less than 20% of their adjacent surface areas. In the absence of a positive bond over at least 80% of the adjacent member surfaces a layer of air is present in the unbonded areas to function as an insulative heat barrier between the inner and outer cone-shaped member.

It will be necessary to secure the fitment to the cone-shaped body portion of the package in a manner which will withstand the considerable stresses to which the package is subjected during the process of dispensing the soft-frozen comestible through the extrusion orifice. In order to effect this type of secure engagement between the fitment and the body portion it has been found necessary to seat the fitment within the cone-shaped body portion in such a manner that the upstanding rim portion of the fitment is recessed below the upper edge of the body portion and to thereafter fold the upper edge of the body portion around the upstanding rim of the fitment. Various heat seal and/or crimping techniques may be employed to produce a seal and/or engagement which will withstand the forces encountered during the extrusion process.

Desirably the upstanding fitment rim is outwardly tapered at an angle which essentially matches the angle of the cone-shaped body portion of the package. In this manner the fitment may be more readily seated within the body portion. If a heat seal is to be made between the fitment rim and package body it will, of course, be necessary for the appropriate surfaces to be composed of a heat sealable material. A low-density polyethylene material would be suitable for this purpose. In a preferred embodiment of the invention the entire fitment and an inner cone member are made of a heat sealable plastic material. When heat sealing is to be utilized it has been found that the seal should preferably be effected at the top and/or inner face of the fitment rim rather than solely at the outer face of the fitment rim.

The comestible material may be supplied to the body assembly either before or after the fitment is secured in place. A removable closure, which may be a snap-on cap, an adhesive sheet or label, or the like will be used to cover the orifice in the fitment. If the fitment is secured to the body assembly before filling with the comestible, the closure will be put into place after filling. If on the other hand the body assembly is filled before the fitment is secured, the cover may be placed on the fitment either before or after the fitment is secured to the body assembly.

The invention will be readily apparent to those skilled in the art upon a reading of the description of the preferred embodiments below when taken in conjunction with the accompanying drawings.

BRIEF DESCRIPTION OF THE DRAWINGS

In the accompanying drawings which are given to illustrate and exemplify the invention but not to limit the invention:

FIG. 1 is an assembly drawing in perspective of the packages of this invention showing the separate elements of the package.

FIG. 2 is a longitudinal central section of an assembled package such as shown in FIG. 1.

FIG. 3 is a partial view similar to FIG. 2 showing another embodiment of the package of this invention.

DESCRIPTION OF THE PREFERRED EMBODIMENTS

Referring to the drawings, FIG. 1 depicts the four elements which are used to fabricate a dispenser package for soft-frozen comestibles in accordance with the preferred embodiments of this invention. These elements include an outer cone-shaped member 1, an inner cone-shaped member 2, an extrusion fitment 3 and a closure 4. The fitment is depicted having a raised central portion 5 which is in the shape of a truncated cone and an extrusion orifice or aperture 6 located on the planar face of the raised central portion 5. The fitment also possesses an upstanding rim 7 around its outer circumference or periphery. This upstanding rim 7 serves as a means to secure the inner and/or outer cones to the fitment. It would, of course, be possible for the fitment to possess a flat central portion (not shown) such that the extrusion orifice would be recessed within the upstanding rim of the fitment.

FIG. 2 depicts one embodiment of an assembled cone wherein the outer cone and the inner cone 2 are essentially coextensive and wherein the top edges of both cones are folded around the upstanding rim 7. In this embodiment both the inner cone 2 and the upstanding rim 7 of the fitment 3 are made of a heat-sealable material. In this manner a heat seal can be made between the two-heat sealable surfaces. Desirably the heat seal should be made on at least at the inner face 8 of the upstanding rim. As shown in FIG. 2 the inner cone 1 and the outer cone 2 are bonded together by a circular band of an adhesive 9. This adhesive which may be of the pressure-sensitive hot-melt or heat-sensitive variety is preferably located, as shown, in the top one-third segment of the conical container. The width of the circular band of adhesive is preferably less than 20% of the length of the container and preferably less than 10% of this length. According to an alternative embodiment of this invention (not shown) the adhesive may be placed in discrete, spaced-apart locations in order to spot bond the outer and inner cones. An insulating layer of air 10 is created in the unbounded areas between the outer cone 1 and inner cone 2. According to one specific embodiment the outer cone 1 is comprised of paper while the inner cone 2 is comprised of a heat sealable plastic film such as polyethylene.

FIG. 3 depicts an embodiment of the invention in which the outer cone 1 is fabricated from a paper sheet 11 which has a heat-sealable layer 12 coated onto its inner surface. In this embodiment the inner cone 2 may also be a paper cone. The inner cone 2 is shorter in length than outer cone 1 and this inner cone does not extend to become part of the seal with the upstanding rim 7 of the fitment. According to a preferred version of this embodiment, the heat-sealable layer 12 is bonded to the upstanding rim 7 at the inner face 8 of the rim.

Having thus described the invention, what is claimed is:

1. A container adapted to hold a soft-frozen extrudable comestible having a moisture content in excess of 30% by weight, said container being collapsible under hand pressure thereby forcing extrudable material contained therein through an orifice, said container being comprised of:
   (a) a collapsible, cone-shaped body portion having an open top and a circular top edge, said body portion comprised of an external cone-shaped paper jacket and an internal, heat-sealable, cone-shaped liner, said liner being bonded to said external jacket over less than 20% of the surface area of the liner such that an insulating layer of air is present between the liner and jacket in the unbonded areas,
   (b) a circular fitment sized to be received by and at least partially recessed within the body portion of said container, said fitment having a central aperture which functions as an extruder orifice and an upstanding rim around its periphery,
   (c) an engagement between said upstanding rim and said body portion, which secures the fitment in place such that it is not dislodged during an extrusion process, said engagement being affected by folding the top edge of the body portion over the upstanding rim of the fitment, and heat sealing the said body portion to said cone-shaped liner of said rim, and
   (d) a removable closure which extends across the aperture located in the fitment.

2. The container of claim 1 wherein the cone-shaped liner is a plastic film which is essentially co-extensive with the cone-shaped jacket such that the fitment is recessed within both the liner and jacket and the plastic liner is heat-sealed to the upstanding fitment rim.

3. The container of claim 2 wherein the plastic liner is bonded to said paper jacket by an adhesive in one or more selected locations.

4. The container of claim 2 wherein the plastic liner is bonded to the jacket by a circular band of adhesive, said band being located in the top one-third of the container and said band having a width which is less than 20% of the length of the container.

5. The container of claim 4 wherein the adhesive is a hot-melt adhesive.

6. The container of claim 2 wherein the adhesive is a pressure-sensitive adhesive.

7. The container of claim 2 wherein the plastic fitment contains a raised, tapered protrusion which contains the central aperture.

8. The container of claim 7 wherein the tapered protrusion is in the shape of a truncated cone.

9. The container of claim 8 wherein the planer face of the truncated cone contains the aperture.

10. The container of claim 8 wherein the removable closure is a snap-on plastic cap which fits over the top of said truncated cone.

11. The container of claim 2 wherein the circular fitment consists of a flat, aperture-containing central portion surrounded by the upstanding rim.

12. The container of claim 2 wherein the upstanding rim of the fitment is outwardly tapered at an angle which matches the angle of the cone-shaped body portion.

13. The container of claim 1 wherein the inner plastic liner and the outer paper jacket are spot bonded together at spaced apart locations.

* * * * *